UNITED STATES PATENT OFFICE.

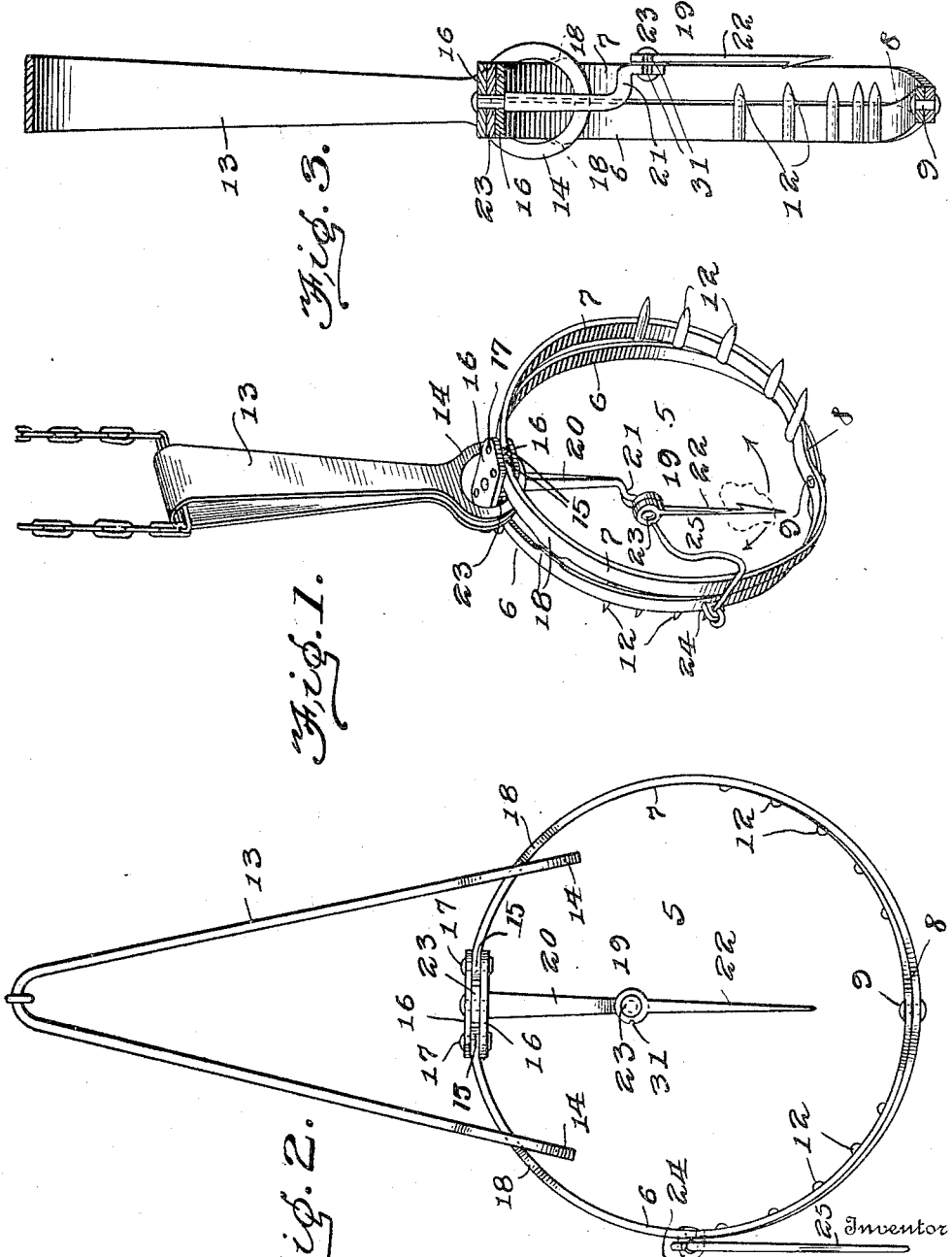

ANDERS G. AHLENIUS, OF MEADOWLANDS, MINNESOTA.

TRAP.

1,210,253.  Specification of Letters Patent.  Patented Dec. 26, 1916.

Application filed July 25, 1916. Serial No. 111,247.

*To all whom it may concern:*

Be it known that I, ANDERS G. AHLENIUS, a citizen of the United States, residing at Meadowlands, in the county of St. Louis and State of Minnesota, have invented new and useful Improvements in Traps, of which the following is a specification.

This invention relates to traps, and more particularly to that class thereunder known as impalement traps.

The primary object of the invention is the provision of a trap of the above stated character which is cheap, simple, which may be readily set and baited, and readily kills the animals when the trap is sprung.

With the above and other objects in view, the invention consists in the novel features, details of construction and combination of parts which will hereinafter be more fully set forth, illustrated in the accompanying drawing and pointed out in the appended claim.

Figure 1 is a perspective view of the trap shown in set position; Fig. 2 is a plan view of the trap closed; and Fig. 3 is a detail view showing the manner of connection of the jaws with one another and the connection of the trigger support of said jaws.

Referring more particularly to the accompanying drawing, in which like characters of reference refer to corresponding parts in the several views, 5 denotes the trap generally, which is primarily adapted for the entrapping of animals, game or the like. The said trap is constructed from a pair of annular steel jaws 6 and 7, and formed medially of each jaw is a downwardly inclined portion 8 disposing one face of the jaw below the plane of the other face of the jaw. These jaws are pivotally connected by a fastener 9 which extends through the downwardly inclined portion 8 of the jaws. In other words, for example, when the trap is in a released position, the construction of the faces of the jaws will permit of the annular jaws reposing upon one another, whereas, when the jaws are in a set position will present one set of prong members, formed at diametrically opposite points of the jaw 6 in active position. Thus when the trap is sprung the animal will be readily entrapped between the jaws 7 thereof.

The operation of this trap is automatic, due to the provision of the flat spring setting member 13. This spring is terminally provided with rings 14 which encircle the jaws at a point adjacent the meeting ends 15 thereof. The meeting ends 15 of the jaws are pivotally connected between the plates 16 through the medium of the fasteners 17. The outermost edges of the respective jaws 6 and 7, at a point adjacent the meeting ends 15 thereof are bulged laterally in an opposite direction, as indicated by the reference character 18, to hold the spring 13 against moving circumferentially of the jaws.

Fixedly secured between the plates 16 is a trigger 19 comprising a supporting bar 20 which extends inwardly and between the jaws 6 and 7, and having an upwardly offset terminal 21 upon which is pivotally mounted the trigger lever 22. The end of the trigger lever 22 which is connected with the supporting bar 20 is of disk formation, denoted by the character 23. The free end of the trigger lever terminates in a spur, whereby the bait may be easily applied thereto and retained thereon against any accidental displacement until the same is engaged by the mouth of the animal.

Formed on the outer periphery of the face 10 of the jaw 6 is an apertured lug 24 to which is pivotally connected a locking hook 25. Said hook is so connected with the apertured lug 24 to adapt the same for horizontal swinging movement, and the inner end 26 of said hook is of substantially L-shaped configuration, thus, upon the throwing of the hook to active position, will permit of the hook engaging over one side of both of the annular jaws 6 and 7, as better shown in Fig. 1 of the drawing. The active end or outer end 27 of said hook is offset downwardly, in order that the free terminal pointed end 28 of said hook will engage in the V-shaped notch 31 formed in the peripheral edge of the disk 23 of said trigger lever 22.

In briefly describing the operation of the device, it is to be stated that the operator, in setting the trap, presses the stout spring 13 by engaging his foot therewith. The jaws are then swung to an open position. The locking hook 25 is swung in an inward horizontal direction until the active end 37 thereof engages in the notch 31 of the disk. When the trap is in this form, the same is connected to a tray or the like through the medium of the chain 32 connected with the spring 13.

From the foregoing description, taken in connection with the accompanying drawing, the advantages of construction and of the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the claim appended thereto.

I claim:

An animal trap comprising a pair of pivotally connected jaws each having offset faces, means for tensioning said jaws, means for pivotally connecting the jaws to one another, an inwardly extending bar, a trigger pivotally mounted on the free end of said bar and having a notched disk, a locking hook pivotally connected with one of said jaws for inward horizontal movement, the active end of said hook engaging in the notch of the disk of said lever for holding the jaws in set position.

In testimony whereof I affix my signature.

ANDERS G. AHLENIUS.

Copies of this patent may be obtained for five cents each, by addressing the "Commissioner of Patents, Washington, D. C."